United States Patent Office 3,803,085
Patented Apr. 9, 1974

3,803,085
METHOD FOR MAKING POLYETHERIMIDES
Tohru Takehoshi, Scotia, and John E. Kochanowski, Watervliet, N.Y., assignors to General Electric Company
No Drawing. Filed Dec. 29, 1972, Ser. No. 319,372
Int. Cl. C08f 11/04
U.S. Cl. 260—46.5 E
14 Claims

ABSTRACT OF THE DISCLOSURE

A process for making polyetherimides is provided by melt polymerizing a mixture of certain aromatic bis(etheranhydride)s and organic diamines. The polyetherimides can be reinforced with various fillers to produce high performance composites.

---

The present invention relates to a melt polymerization process for making polyetherimides based on the reaction between certain aromatic bis(etheranhydride)s and organic diamines.

Prior to the present invention polyimides were generally made from a polyamide acid intermediate. A dipolar aprotic solvent is required to produce such polyamide acid intermediate before it can be converted to the polyimide state. Unlike polyamides, polyimides are intractable and decompose before they can be melted. At best, the more readily processable polyamide acid can be converted to a film or coating. However, the removal of solvent causes air pollution.

As shown in our copending application Ser. No. 319,371 filed concurrently herewith and assigned to the same assignee as the present invention, polyetherimide reaction products of aromatic bis(etheranhydride) and organic diamine can be made at elevated temperatures in the presence of organic solvent to produce moldable polyehterimides. However, organic solvent is required which causes air pollution. In addition, several additional processing steps are necessary before the final product can be recovered.

The present invention is based on the discovery that moldable polyetherimides can be made directly from certain aromatic bis(etheranhydride)s and organic diamines, as defined hereinafter, in the absence of organic solvent. These polyetherimide forming ingredients can be melt polymerized at temperatures up to 350° C.

There is provided by the present invention, a method for making polyetherimides which comprises effecting the removal of water of reaction at temperatures up to 350° C. from the melt of a mixture containing as essential ingredients aromatic bis(etheranhydride) of the formula, (1)

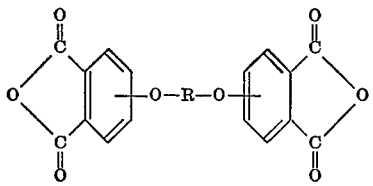

and organic diamine of the formula, (2)    $H_2NR^1NH_2$ where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chloro-phenylene, naphthalene, etc., and radicals included by the formula, $$-R^2-(Q)_a-R^2-$$

where $R^2$ is a divalent aromatic radical having from 6–13 carbon atoms selected from hydrocarbon radicals and halogenated hydrocarbon radicals, and Q is a divalent organo radical selected from

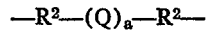

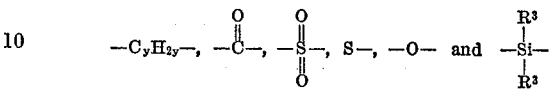

where $a$ is 0 or 1, $y$ is an integer having a value of from 1–5 inclusive, and $R^3$ is a monovalent hydrocarbon radical selected from methyl, phenyl, etc.

Radicals included by $R^1$ are, for example,

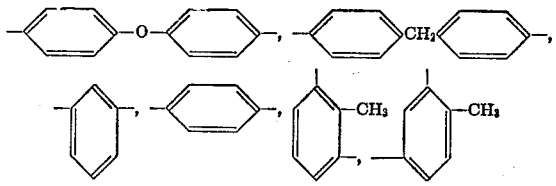

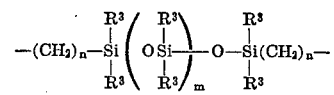

etc.; alkylene radicals such as hexamethylene, etc., cyclohexylene, etc.

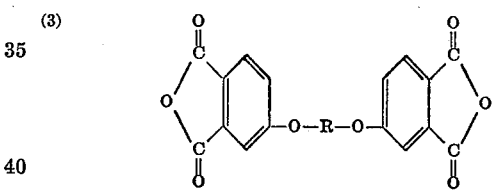

where R is as defined above, $m$ is equal to 0 to 100 inclusive and $n$ is 2–8 inclusive.

(3)

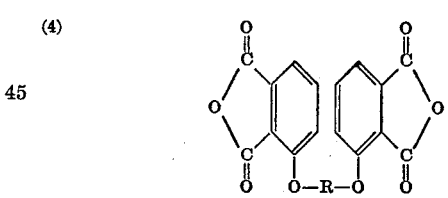

(4)

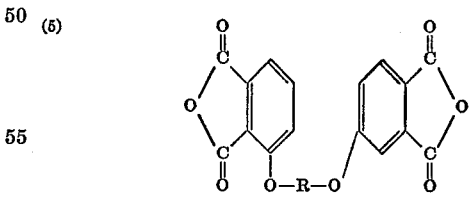

(5)

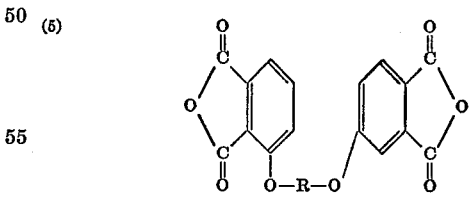

where R is defined above. A preferred form of R is,

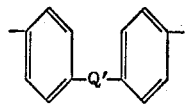

where Q' is selected from

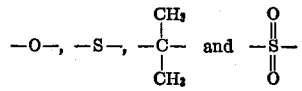

Dianhydrides included by Formula 3 are for example, 2,2′-bis[4-(2,3-dicarboxyphenoxy)phenyl]-propane dianhydride;

4,4'-bis(2,3-dicarboxyphenoxy)diphenyl ether dianhydride;
1,3-bis(2,3-dicarboxyphenoxy)-benzene dianhydride;
4,4'-bis-(2,3-dicarboxyphenoxy)-diphenyl sulfide dianhydride;
1,4-bis(2,3-dicarboxyphenoxy)-benzene dianhydride;
4,4'-bis(2,3-dicarboxyphenoxy)-diphenyl sulfone dianhydride; etc.

Dianhydrides included by Formulas 4 and 5 are for example, 2,2-bis[4-(3,4-dicarboxyphenoxy)-phenyl]-propane dianhydride;
(3,4-dicarboxyphenoxy)-diphenyl ether dianhydride;
4,4'-bis(3,4-dicarboxyphenoxy)-diphenylsulfone dianhydride;
1,3-bis(3,4-dicarboxyphenoxy)-benzene dianhydride;
1,4-bis(3,4-dicarboxyphenoxy)-benzene dianhydride;
4,4₂-bis(3,4-dicarboxyphenoxy)-diphenylsulfone dianhydride;
4-(2,3-dicarboxyphenoxy)-4'-(3,4-dicarboxyphenoxy)-2,2-diphenyl propane dianhydride, etc.

In addition to Formulas 3–5 above, aromatic bis(etheranhydride)s also included by Formula 1 are shown by Koton, M. M.; Florinski, F. S.; M. I.; Rudakov, A. T. (Institute of Heteroorganic Compounds, Academy of Sciences, U.S.S.R.) U.S.S.R. 257,010, 11 November 1969, APPL 03 May 1967. In addition dianhydrides shown M. M. Koton, F. S. Florinski, Zh Org. Khin 4(5) 774 (1968).

Some of the aromatic bis(etheranhydrides) of Formula 1 are shown in copending application of Darrell Heath and Joseph Wirth Ser. No. 281,749, filed Aug. 18, 1972, and assigned to the same assignee as the present invention. These dianhydrides can be prepared from the hydrolysis, followed by dehydration of the reaction product of a nitro-substituted phenyl dinitrile with a metal salt of a dihydric phenol compound in the presence of a dipolar aprotic solvent. For example, a benzenoid compound of the formula

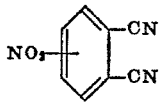

where the $NO_2$ group can be positioned anywhere in the benzene ring, can be reacted in dimethyl formamide with an alkali metal salt of a dihydric phenol of the general formula,

where $R^2$ is a divalent aromatic radical and Alk is an alkali metal ion. Various well known procedures can be used to convert the resulting tetranitriles to the corresponding tetraacids and dianhydrides.

Included by the alkali metal salts of the above described dihydric phenols are sodium and potassium salts of the following dihydric phenols, 2,2-bis-(2-hydroxyphenyl)propane;
2,4'-dihydroxydiphenylmethane;
bis-(2-hydroxyphenyl)-methane;
2,2-bis-(4-hydroxyphenyl)-propane hereinafter identified as "bisphenol-A" or "BPA";
1,1-bis-(4-hydroxyphenyl)-ethane;
1,1-bis-(4-hydroxyphenyl)-propane;
2,2-bis-(4-hydroxyphenyl)-pentane;
3,3-bis-(4-hydroxyphenyl)-pentane;
4,4'-dihydroxybiphenyl;
4,4'-dihydroxy-3,3',5,5'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide; etc.

In addition to the above described "Group A" dihydric phenols, there also can be employed in the present invention, aromatic bis(etheranhydrides) derived from the alkali metal salts of the following "Group B" dihydric phenols:

hydroquinone;
resorcinol;
3,4'-dihydroxydiphenyl methane;
4,4'-dihydroxybenzophenone; and
4,4'-dihydroxydiphenylether.

Included by the organic diamines of Formula 2 are for example, m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl) ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl) sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

In the practice of the invention, a mixture of the aromatic bis(etheranhydride) and the organic diamine is heated under an inert atmosphere, such as a nitrogen atmosphere to form a homogenous melt and the water as it is formed is removed therefrom.

The temperature of the melt is maintained above the glass transition temperature of the resulting polyetherimide, but below a temperature of about 400° C. Preferably, the melt polymerization is conducted at a temperature of about between 250° C. to 300° C. The polymerization is facilitated by purging the melt with an inert gas such as nitrogen. It also has been found expedient to employ reduced pressure at the final stage of the polymerization to facilitate removal of water. Stirring of the mixture can be employed. The course of the reaction can be readily followed by the change in melt viscosity of the mixture.

It has been found that substantially equal molar amounts of the organic diamine and the aromatic bis(etheranhydride) provide optimum results. Effective results can be achieved with 0.5 to 2.0 moles of organic diamine, per mole of aromatic bis(etheranhydride). Monofunctional organic amine such as aniline, or organic anhydrides such as phthalic anhydride provide molecular weight control. Low molecular weight polyetherimide can be employed to form copolymers. From 0.1 to 50 mole percent of comonomers based on the total moles of reactants can be employed.

Polyetherimide having from 2 to 500 and preferably 10 to 50 average repeating units can be formed. These polymers can be blended with various fillers such as silica fillers, glass fibers, carbon whiskers, perlite, etc. The resulting filled compositions can have a proportion of from about 1 parts to 70 parts of filler per hundred parts of polyetherimide. The blending of the filler with the polyetherimide can be achieved by adding the filler prior to forming the melt or directly to the melt. Stirring can be effected with a standard agitating means to facilitate blending the ingredients.

In order that those skilled in the art will be better able to practice the invention, the following examples are given by way of illustration and not by way of limitation. All parts are by weight.

EXAMPLE 1

A mixture of 2,2-bis[4-(2,3-dicarboxyphenoxy)phenyl] propane dianhydride (3.0000 parts) and 4,4'-methylenedianiline (1.1418 parts) was heated to 290° C. for one half hour under nitrogen, and for one and one quarter hour in vacuo. The yield of the polymer was 2.0 parts. The intrinsic viscosity of the polymer in dimethylformamide was .46 dl./g. The elemental analysis found was: C, 77.8%; H, 4.5% and N, 4.1%. Calculated for $(C_{44}H_{30}N_2O_6)_n$ is: C, 77.4%; H, 4.4% and N, 4.1%. The infrared spectrum; $\lambda_{max}$ 1770, 1714, 1352, 1274 and 1239 cm.$^{-1}$. Based on method of preparation, elemental analysis and spectral data, the product was a polyetherimide.

The above polyetherimide is molded at 275° C. and a pressure of 5000–10,000 p.s.i. to a finished part. The molded part forms an exact reproduction of the mold.

EXAMPLE 2

A mixture of 2,2-bis[4-(3,4-dicarboxyphenoxy)phenyl] propane dianhydride (3.0000 parts) and 4,4'-diaminodiphenyl ether (1.1520 parts) was heated at 300° C. with stirring for one-half hour under nitrogen, and for one and one-quarter hours in vacuo. The yield of the polymer was 2.68 parts. The intrinsic viscosity in dimethylacetamide was 1.00 dl./g. The infrared spectrum was taken of a clear flexible film cast from a chloroform solution: $\lambda_{max}$; 1767, 1712, 1372, 1275, 1244 and 1217 cm.$^{-1}$. The thermal decomposition temperature of the polymer was 510° C. in introgen, and 410° C. in air as determined by thermal gravimetric analysis.

EXAMPLE 3

A mixture of 2,2-bis[4-(3,4-dicarboxyphenoxy)phenyl] propane dianhydride (3.0000 parts), and, 4,4'-methylenedianiline (1.1418 parts) was heated at 290° C. for one-half hour under nitrogen and one and one-quarter hours under vacuum. The yield of the amber glassy polymer was 4.0 parts. The intrinsic viscosity of the polymer was .65 dl./g. in dimethylformamide. The thermal decomposition temperature of the polymer was 450° C. in nitrogen and 420° C. in air as determined by thermal gravimetric analysis. A tough flexible film was cast from a chloroform solution.

Based on method of preparation, the polymer was a polyetherimide.

EXAMPLE 4

A mixture of 2,2-bis[4-(2,3-dicarboxyphenoxy)phenyl] propane dianhydride (6.0000 parts), phthalic anhydride (.1706 part) and 4,4'-diaminodiphenyl ether (2.4236 parts) was heated to 270° C. under nitrogen for one hour. The yield of the polymer was 7.49 parts. The intrinsic viscosity in dimethylformamide was .34 dl./g. The number average and weight average molecular weights were 10.300 and 25.400, respectively.

EXAMPLE 5

A mixture of 4,4'-diaminodiphenyl ether (1.2152 parts) and 4,4'-bis(2,3-dicarboxyphenoxy)diphenyl ether dianhydride (3.0000 parts) was heated to 290° C. under nitrogen with stirring. The yield of the tough glassy polymer was 2.8 parts. The intrinsic viscosity of the polymer was .53 dl./g. in chloroform. The elemental analysis found: C, 72.4%; H, 3.4% calculated for $(C_{40}H_{24}N_2O_8)_n$ is C, 72.7%; H, 3.5%. The thermal decomposition temperature was 480° C. in air is determined by thermo-gravimetric analysis.

EXAMPLE 6

A mixture of 4,4'-bis(3,4-dicarboxyphenoxy)diphenyl ether dianhydride (3.5228 parts) and hexamethylenediamine (.8529 part) was heated to 290° C. for one hour with stirring under nitrogen. The yield of the tough amber polymer was 3.0 parts. The intrinsic viscosity in chloroform was .48 dl./g. The elemental analysis. found was: C, 71.6%; H, 4.9% and N, 4.7%. Calculated for $(C_{34}H_{28}N_2O_7)_n$ is C, 70.8%; H, 4.97%; and N, 4.9%. The thermal decomposition temperature was 440° C. in nitrogen and 420° C. in air as determined by thermal gravimetric analysis.

EXAMPLE 7

A mixture of 1,4-bis(2,3-dicarboxyphenoxy)benzene dianhydride (2.5000 parts) and 4,4'-methylenedianiline (1.2320 parts) was heated to 290° C. under nitrogen, with stirring for 1 hour. The yield of the polymer was 2.67 parts. The intrinsic viscosity in meta-cresol was 0.45 dl./g. The elemental analysis: C, 74.6%; H, 2.8%. Calculated for $(C_{22}H_{10}N_2O_6)$ is C, 73.6%; H, 2.9%. The infrared spectrum was taken from a tough flexible film cast from meta-cresol: $\lambda_{max}$ 1772, 1715, 1378, 1249 and 1885 cm.$^{-1}$. The thermal decomposition temperature was 480° C. nitrogen and 480° C. in air as determined by thermal gravimetric analysis.

EXAMPLE 8

A mixture of 4,4'-bis(3,4-dicarboxyphenoxy)diphenylsulfide dianhydride (2.5571 parts) and bis-(4-aminobutyl)-tetramethyldisiloxane (1.4259 parts) were heated under nitrogen with stirring to 260° C. The yield of the polymer was 3.0 parts. The intrinsic viscosity in chloroform was 0.55 dl./g. The infrared spectrum was taken from a tough flexible film cast from chloroform: $\lambda_{max}$ 1762, 1702, 1440, 1390, 1230 and 1164 cm.$^{-1}$. The thermal decomposition temperature of the polymer was 450° C. in nitrogen and 410° C. in air as determined by thermal gravimetric analysis.

EXAMPLE 9

A mixture of 2,2-bis[4-(2,3-dicarboxyphenoxy)phenyl] propane dianhydride (5.1985 parts) and 4,4'-methylenedianilene (2.0000 parts) were heated to 270° C. under nitrogen for one hour. The yield of the polymer was 6.09 parts. The intrinsic viscosity of the polymer was 4.6 dl./g. in dimethylformamide. The elemental analysis found was: C, 77.8%; H, 4.5%; N, 4.1%. Calculated for $(C_{44}H_{30}N_2O_6)_n$ is C, 77.4%; H, 4.4% and N, 4.1%.

EXAMPLE 10

A mixture of 2,2-bis[4-(3,4-dicarboxyphenoxy)phenyl] propane dianhydride (50.0000 parts) and 4,4'-methylenedianiline (18.6722 parts) was heated to 270° C. under nitrogen with stirring for one and one-half hours. The intrinsic viscosity in dimethylformamide was .52 dl./g. The polymer was extruded at 275° C. by use of a screw extruder. Molded samples were made of the extruded material. The molded samples had a tensile strength of 11,300 p.s.i. and the elongation was 6.7%.

EXAMPLE 11

A mixture of 2,2-bis[4-(2,3-dicarboxyphenoxy)phenyl] propane dianhydride (1.5000 parts and 2,2-bis[4-(3,4-dicarboxyphenoxy) - phenyl]propane dianhydride (1.500 parts) and 4,4'-methylenedianiline (1.1418 parts) was heated with stirring to 290° C. under nitrogen for forty five minutes and in vacuo for fifteen minutes. The yield of the polymer was 3.2 parts. The intrinsic viscosity in chloroform was 1.37 dl./g. The infrared spectrum: $\lambda_{max}$: 1768, 1700, 1360, 1250, 1078 cm.$^{-1}$.

EXAMPLE 12

A mixture of 1,4-bis(3,4-dicarboxyphenoxy)benzene dianhydride (2.2902 parts) and bis-(4-aminobutyl)tetramethyldisiloxane (1.5587 parts) was heated to 270° C. with stirring for forty-five minutes under nitrogen and for fifteen minutes in vacuo. The yield of the polymer was 2.92 parts. The intrinsic viscosity of the polymer in chloroform was 0.37 dl./g. The infrared spectrum: $\lambda_{max}$ 1762, 1700, 11462, 1432, 1224, 1190 cm.$^{-1}$. The thermal decomposition temperature of the polymer was 430° C. in nitrogen and 390° C. in air as determined by thermal gravimetric analysis.

EXAMPLE 13

A mixture of 2,2-bis[4-(2,3-dicarboxyphenoxy)]propane dianhydride (8.099 parts) and 2,4-toluenediamine (1.8628 parts) was heated under nitrogen at 240° C. for 15 minutes. The melt was further heated at 275° under vacuum for 0.5 hour. The polymer melt was cooled, dissolved in about 100 parts of chloroform. The solution was poured in methanol to yield 8.80 parts of polymer.

EXAMPLE 14

A mixture of 2,2-bis[4-(2,3-dicarboxyphenoxy)phenyl] propane dianhydride (6.690 parts) and hexamethylenediamine (1.494 parts) was heated at 225° for 20 minutes at 245° for 40 minutes and then at 245° under vacuum for 5 minutes. On cooling, amber colored, tough polymer was obtained in 93.4% yield. On the basis of the method of preparation, the polymer possesses the chemical constituent of $C_{37}H_{32}N_2O_6$: Analysis found C, 74.7 and H, 5.5; calc. C, 74.0 and H, 5.4.

Based on method of preparation and elemental analysis the polymer was a polyetherimide. It is molded to a finished part in accordance with the procedure of Example 1.

What we claim as new and desire to secure by Letters Patent of the United States is:

1. A method for making polyetherimide which comprises effecting the removal of water of reaction at temperatures of up to 400° C. by using either stirring an inert gas purge or reduced pressure from the melt of a mixture containing as essential ingredients aromatic bis-(etheranhydride) of the formula (1) 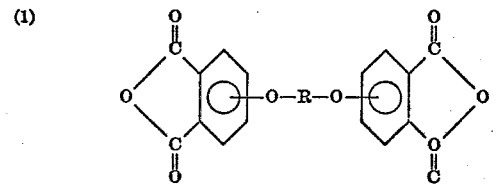

and organic diamine of the formula, (2) $H_2NR^1NH_2$ where R is a divalent aromatic organo radical having from 6-30 carbon atoms, $R^1$ is a divalent organo radical selected from R radicals, alkylene radicals having from 2-20 carbon atoms, cycloalkylene radicals, and $C_{(2-8)}$ alkylene terminated polydiorganosiloxane.

2. A method for making polyetherimide in accordance with claim 1, where there is present in said melt at least two different aromatic bis(etheranhydride)s.

3. A method for making polyetherimide in accordance with claim 1, where there is present in said melt at least two different organic diamines.

4. A method in accordance with claim 1, where the aromatic bis(etheranhydride) has the formula,

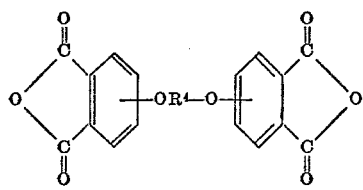

where $R^4$ is

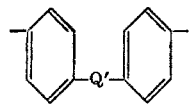

and Q' is a member selected from the class consisting of

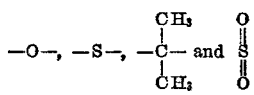

5. A method in accordance with claim 4 where the aromatic bis(etheranhydride) has the formula,

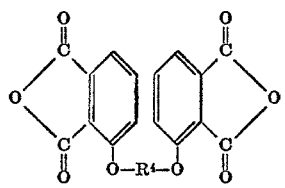

6. A method in accordance with claim 4, where the aromatic bis(etheranhydride) has the formula,

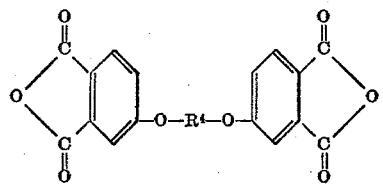

7. A method in accordance with claim 4, where the aromatic bis(etheranhydride) has the formula,

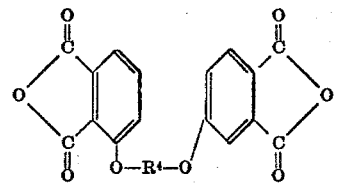

8. A method in accordance with claim 1, utilizing a mixture of 2,2-bis[4-(3,4-dicarboxyphenoxy)phenyl]propane dianhydride and 4,4'-diaminodiphenyl ether.

9. A method in accordance with claim 8, employing methylene dianiline in place of 4,4'-diaminodiphenyl ether.

10. A method in accordance with claim 8 employing 2,2-bis[4-(2,3-dicarboxyphenoxy)phenyl]propane dianhydride in place of 2,2-bis[4-(3,4-dicarboxyphenoxy)phenyl]propane dianhydride.

11. A method in accordance with claim 9, employing a mixture of 2,2-bis[4-(3,4-dicarboxyphenoxy)phenyl]

propane dianhydride and 2,2-bis[4-(2,3-dicarboxyphenoxy)phenyl]propane dianhydride as a dianhydride portion.

12. A method in accordance with claim 1, employing a mixture of 2,2-bis[4-(2,3-dicarboxyphenoxy)phenyl]propane dianhydride and bis(4-aminobutyl)-tetramethyldisiloxane.

13. A method in accordance with claim 1, employing a mixture of 2,2-bis[4-(2,3-dicarboxyphenoxy)phenyl]propane dianhydride and methylenedianiline.

14. A method in accordance with claim 1, when the melt contains a filler.

References Cited
UNITED STATES PATENTS

| | | | |
|---|---|---|---|
| 3,274,155 | 9/1966 | Saunders et al. | 260—46.5 E |
| 3,325,450 | 6/1967 | Holub | 260—46.5 E |
| 3,649,601 | 3/1972 | Critchley et al. | 260—47 CP |

DONALD F. CZAJA, Primary Examiner

M. I. MARQUIS, Assistant Examiner

U.S. Cl. X.R.

260—37 N, 47 CP, 49, 78 TF

UNITED STATES PATENT OFFICE
CERTIFICATE OF CORRECTION

Patent No. 3,803,085     Dated April 9, 1974

Inventor(s) Tohru Takekoshi and John E. Kochanowski

It is certified that error appears in the above-identified patent and that said Letters Patent are hereby corrected as shown below:

Column 1, line 3, cancel "Takehoshi" and substitute "Takekoshi"

Column 2, line 10, cancel $$-C_yH_{2y}-,\ -\overset{\overset{O}{\|}}{C}-,\ -\overset{\overset{O}{\|}}{\underset{\underset{O}{\|}}{S}}-,\ S-,\ -O-\ \text{and}\ -\overset{R^3}{\underset{R^3}{\overset{|}{\underset{|}{Si}}}}-$$

and substitute $$-C_yH_{2y}-,\ -\overset{\overset{O}{\|}}{C}-,\ -\overset{\overset{O}{\|}}{\underset{\underset{O}{\|}}{S}}-,\ -S-,\ -O-\ \text{and}\ -\overset{R^3}{\underset{R^3}{\overset{|}{\underset{|}{Si}}}}-$$

Column 3, line 18, cancel "4,4$_2$-bis(3,4-dicarboxyphenoxy)-diphenylsulfone dian-" and substitute "4,4'-bis(3,4-dicarboxyphenoxy)-diphenylsulfone dian-"

Column 6, line 61, cancel "4.6" and substitute "0.46"

Column 7, line 20, cancel "11462" and substitute "1462"

Signed and sealed this 1st day of October 1974.

(SEAL)
Attest:

McCoy M. GIBSON JR.
Attesting Officer

C. MARSHALL DANN
Commissioner of Patents

UNITED STATES PATENT OFFICE
CERTIFICATE OF CORRECTION

PATENT NO. : 3,803,085
DATED : April 9, 1974
INVENTOR(S) : Tohru Takekoshi and John E. Kochanowski It is certified that error appears in the above-identified patent and that said Letters Patent are hereby corrected as shown below:

Column 7, line 52, after "stirring" insert -,-.

Signed and Sealed this eleventh Day of May 1976

[SEAL]

Attest:

RUTH C. MASON
Attesting Officer

C. MARSHALL DANN
Commissioner of Patents and Trademarks